(12) United States Patent
Uehara et al.

(10) Patent No.: US 11,890,665 B2
(45) Date of Patent: *Feb. 6, 2024

(54) METAL GASKET AND PRODUCTION METHOD THEREFOR

(71) Applicant: PROTERIAL, LTD., Tokyo (JP)

(72) Inventors: Toshihiro Uehara, Shimane (JP); Junichi Nishida, Shimane (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,404

(22) Filed: Aug. 25, 2022

(65) Prior Publication Data
US 2023/0166318 A1  Jun. 1, 2023

Related U.S. Application Data

(63) Continuation of application No. 16/062,845, filed as application No. PCT/JP2016/087410 on Dec. 15, 2016, now Pat. No. 11,471,929.

(30) Foreign Application Priority Data

Dec. 18, 2015 (JP) .................. 2015-247307
Sep. 29, 2016 (JP) .................. 2016-190741

(51) Int. Cl.

| | | |
|---|---|---|
| C22C 38/50 | (2006.01) | |
| B21D 53/84 | (2006.01) | |
| C22C 38/58 | (2006.01) | |
| F16J 15/08 | (2006.01) | |
| C22C 38/00 | (2006.01) | |
| C22C 30/00 | (2006.01) | |
| C22F 1/10 | (2006.01) | |
| C22C 19/05 | (2006.01) | |
| C21D 8/04 | (2006.01) | |
| C21D 6/00 | (2006.01) | |
| C22C 38/48 | (2006.01) | |
| C22C 38/54 | (2006.01) | |
| C22C 38/44 | (2006.01) | |
| C22C 38/04 | (2006.01) | |
| C21D 9/00 | (2006.01) | |
| C22C 38/02 | (2006.01) | |
| C22C 38/06 | (2006.01) | |
| C22C 38/12 | (2006.01) | |
| C21D 9/46 | (2006.01) | |

(52) U.S. Cl.
CPC ............ *B21D 53/84* (2013.01); *C21D 6/004* (2013.01); *C21D 8/0436* (2013.01); *C21D 9/0068* (2013.01); *C22C 19/056* (2013.01); *C22C 30/00* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/44* (2013.01); *C22C 38/48* (2013.01); *C22C 38/50* (2013.01); *C22C 38/54* (2013.01); *C22C 38/58* (2013.01); *C22F 1/10* (2013.01); *F16J 15/08* (2013.01); *F16J 15/0806* (2013.01); *C21D 9/46* (2013.01); *C21D 2211/001* (2013.01); *C21D 2211/004* (2013.01)

(58) Field of Classification Search
CPC ...................................................... C22C 38/50
See application file for complete search history.

(56) References Cited

U.S. PATENT DOCUMENTS

| | | | |
|---|---|---|---|
| 5,370,838 A | 12/1994 | Sato et al. | |
| 11,471,929 B2 * | 10/2022 | Uehara | ............. C22F 1/10 |
| 2004/0184946 A1 | 9/2004 | Tominaga et al. | |
| 2008/0042370 A1 | 2/2008 | Zurfluh | |
| 2008/0217866 A1 | 9/2008 | Tripathy et al. | |
| 2010/0170597 A1 | 7/2010 | Zurfluh | |
| 2013/0283883 A1 | 10/2013 | Tripathy et al. | |

FOREIGN PATENT DOCUMENTS

| | | |
|---|---|---|
| DE | 694 14 529 | 7/1999 |
| JP | 7-11376 | 1/1995 |
| JP | 9-279315 | 10/1997 |
| JP | 11-229059 | 8/1998 |
| JP | 2004-277860 | 10/2004 |
| JP | 2011-80598 | 4/2011 |
| JP | 2011-127204 | 6/2011 |
| JP | 2014-047409 | 3/2014 |
| JP | 2014047409 A * | 3/2014 |

OTHER PUBLICATIONS

International Search Report, dated Mar. 14, 2017 in corresponding International Patent Application No. PCT/JP2016/087410.
Office Action dated Feb. 23, 2023, in corresponding German Patent Application No. 112016005830.6, with English translation.

* cited by examiner

*Primary Examiner* — Jophy S. Koshy
(74) *Attorney, Agent, or Firm* — Wenderoth, Lind & Ponack, L.L.P.

(57) ABSTRACT

Provided is a metal gasket including, expressed in mass%, C: 0.10% or less, Si: 1.0% or less, Mn: 2.0% or less, P: 0.04% or less (including 0%), S: 0.01% or less (including 0%), Ni: 25.0-60.0%, Cr: 10.0-20.0%, either Mo or W alone, or both Mo+W/2: 0.05-5.0%, Al: more than 0.8% to 3.0% or less, Ti: 1.5-4.0%, Nb: 0.05-2.5%, V: 1.0% or less (including 0%), B: 0.001-0.015%, Mg: 0.0005-0.01%, S/Mg: 1.0 or less, N: 0.01% or less (including 0%), and O: 0.005% or less (including 0%), with the remainder being Fe and unavoidable impurities. The metal gasket has a metal structure in which a precipitate γ' phase having an average equivalent circle diameter of 25 nm or larger is not present within the austenite base.

8 Claims, 2 Drawing Sheets

METAL GASKET AND PRODUCTION METHOD THEREFOR

TECHNICAL FIELD

The present invention relates to a metal gasket with which working is easy and of which high strength is obtained when used at a high temperature and a method for producing the same.

BACKGROUND ART

In an internal-combustion engine such as an automobile engine, a metal gasket is joined between various joint portions by, being interposed therebetween in order to prevent leakage of a combustion gas, coolant, and the like at a high temperature and to maintain sealability. In recent years, a combustion temperature of an engine has shown a tendency to be increased due to improvement of fuel efficiency of an automobile, tightening of exhaust gas regulation, and the like. In addition, engines in which a turbocharger that uses a high-temperature exhaust gas or EGR is installed have also been more prevalent. Due to the increase in the combustion temperature of an automobile engine, improvement in heat resistance of an engine member is required. A heat-resistant material with increased high-temperature strength and oxidation resistance has been applied as a metal material used in an exhaust engine valve, a spark plug, a wheel for a turbocharger, and the like. High-temperature strength is also required to be high in a metal gasket and a bolt of an exhaust system, which are used in a joint portion of an engine including a turbocharger, EGR, and the like.

In the related art. an austenitic stainless steel SUS301 has been widely used in a metal gasket for a cylinder head of an automobile engine. However, along with improvement in performance of an engine, an austenitic stainless steel containing a large amount of N was developed for a metal gasket of which strength, high-temperature strength, and oxidation resistance have been further improved (PTL 1). Furthermore, a metal gasket formed of an Fe-Ni-Cr alloy strengthened by a combination of cold rolling and precipitation hardening and a method for producing the same are disclosed (PTL 2).

Prior Art Document

Patent Literature

[PTL 1] JP-A-9-279315
[PTL 2] JP-A2011-80598
Summary of Invention
Problem to be Solved by Invention.

A stainless steel disclosed in PTL I is an austenitic stainless steel. of which strength in a high temperature has been improved by adding a large amount of N. However, in a case where the stainless steel is used in a metal gasket of an exhaust system exposed to a higher temperature, there is a limitation in improving high-temperature strength by adding N. In addition, PTL 2 discloses an alloy of a metal gasket formed of various Fe-Ni-Cr alloys and a method for producing the metal gasket. In particular, regarding an Fe-Ni-Cr alloy that can be precipitation hardened, hardness of the metal gasket is increased by performing a precipitation hardening treatment before use. In other words, performing a precipitation hardening heat treatment before use has been suggested, in order to impart strength sufficient for enduring usage at a high temperature. However, since the precipitation hardening, heat treatment of a precipitation hardening Fe-Ni-Cr alloy containing Al, Ti, Nb, and the like generally requires a long period of time, problems such as cost for the precipitation hardening heat treatment, deformation during the heat treatment: oxidation of a surface, and coloration arise, An object of the present invention is to provide a metal gasket which is suitable for a joint part of an exhaust system exposed to a high temperature, such as an automobile engine, can be easily formed by cold working, and is excellent in high-temperature strength which is strengthened by precipitation hardening during use without performing an active aging treatment by being exposed to a high temperature, and a method for producing the same.

Means for Solving the Problem

In order to solve the problem, the present Inventors conducted intensive research on a precipitation hardening Fe-base superalloy (also referred to as a precipitation strengthening Fe-base superalloy) having a specific alloy composition. As a result, the present inventors found that a precipitation hardening Fe-base superalloy subjected to a solution treatment can be cold worked, can be cold rolled into a thin plate such as a metal gasket, and can be press worked into a gasket shape. The present inventors also found that, in a case where a metal gasket of an exhaust system is exposed to a high temperature of approximately 600° C. to 850° C. in a state of being subjected to a solution treatment and in a state of being subjected to cold working after the solution treatment, aging precipitation strengthening similar to a state in which an age hardening treatment is performed takes place, and the gasket is gradually strengthened (hardened). A metal structure for achieving balance between such cold workability and aging precipitation strengthening during use was found, thereby completing the present invention.

According to an aspect of the present invention, there is provided a metal gasket including, in terms of % by mass, C: 0.10% or less, Si: 1.0% or less, Mn:>2.0% or less, P: 0.04% or less (including 0%), S: 0.01% or less (including 0%), Ni: 25.0% to 60.0%, Cr: 10.0% to 20.0%, one or both of Mo and W satisfying Mo+W/2: 0.05% to 5.0%, Al: more than 0.8% and 3.0% or less, Ti: 1.5% to 4.0%, Nb: 0.05% to 2.5%, V: 1.0% or less (including 0%), B: 0.001% to 0.015%, Mg: 0.0005% to 0.01%, wherein S/Mg: 1.0% or less, N: 0.01% or less (including 0%), O: 0.005% or less (including 0%), and a remainder consisting of Fe and unavoidable impurities, in which a precipitate γ' phase having an average equivalent circle diameter of 25 nm or greater is not present in an austenite matrix.

An average equivalent circle diameter of the precipitate γ phase is preferably smaller than 20 nm.

According to another aspect of the present invention, there is provided a method for producing a metal gasket including: plastic working of a material for cold rolling having the composition into a thin plate shape by performing, cold rolling on the material; and performing a process of forming the material into a metal gasket shape having a metal structure in which a precipitate γ' phase having an equivalent circle diameter of 25 nm or greater is not present in an, austenite matrix, An average equivalent circle diameter of the precipitate γ' phase is preferably smaller than 20 nm.

Furthermore, a solution treatment is preferably performed on the cold rolled material subjected to the plastic working into the thin plate shape at 900° C. to 1150° C.

The method for producing a metal gasket further includes performing a solution treatment on the metal gasket subjected to the process of forming into the metal gasket shape at 900° C. to 1150° C., and the metal gasket subjected to the process of forming or the metal gasket subjected to the solution treatment is preferably further subjected to an aging treatment at 700° C. to 850° C. for 0.5 to 5 hours.

Advantageous Effects of the Invention

According to the present invention, the metal gasket is used in a joint part exposed to a high temperature such as an exhaust system of an automobile engine, is capable of having both favorable cold workability into a gasket shape and high strength at a high temperature during use, and exhibits higher reliability.

DETAILED DESCRIPTION

Figure 1:
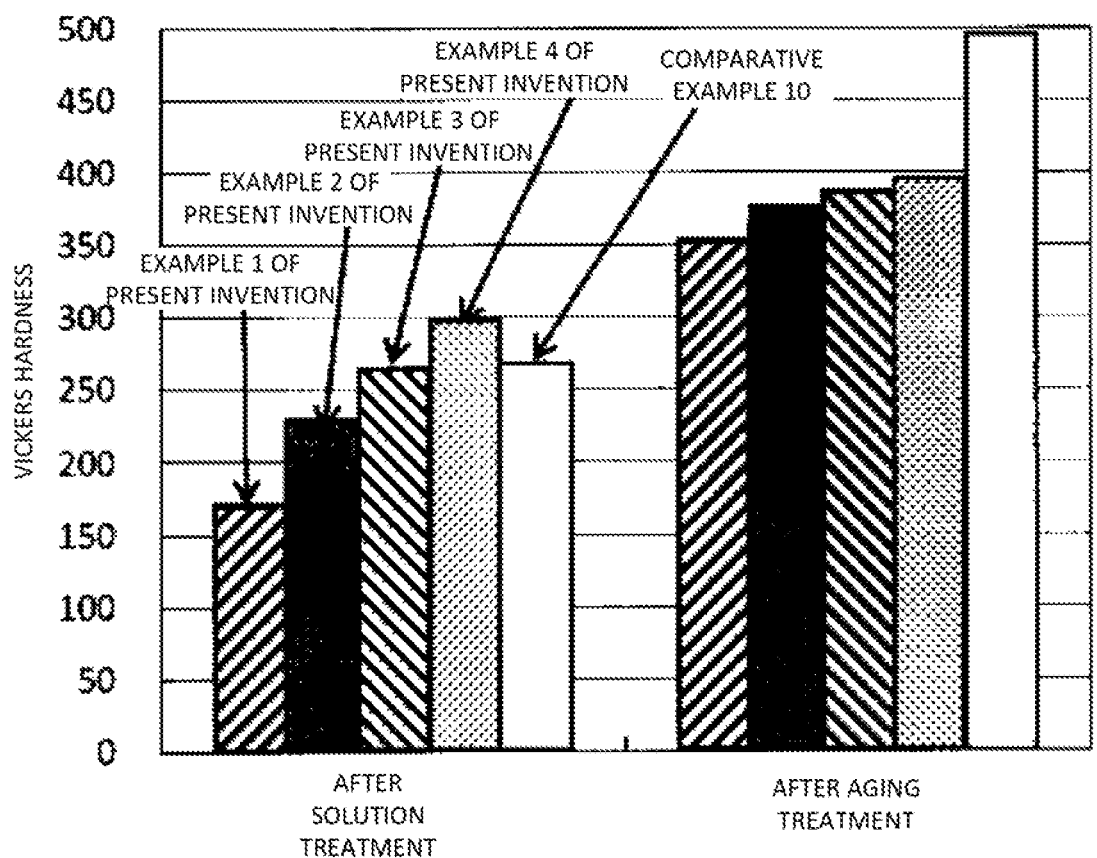
FIG. 1 is a graph for comparing Vickers hardness after a solution treatment and after an aging treatment.

First, each element and the content thereof specified in the present invention will be described. Unless otherwise particularly specified, the content is expressed as % by mass.

<C: 0.10% or less>

It is necessary to add a small amount of C: since a small amount of C forms an MC-type carbide with Ti, Nb, and V and refines crystal grains, thereby having an effect of improving balance between strength and ductility at a room temperature and a high temperature. However, in a case where C is added at a content that exceeds 0.10%, coarse MC-type carbides are formed, decreasing ductility or reducing amounts of Ti and Nb required for age-hardening during use. Therefore, the content of C is set to be 0.10% or less. The content of C is preferably 0.08% or less and more preferably 0.05% or less. Furthermore, in order to reliably obtain the effect of adding C, the lower limit of the content of C may be set to be 0.01%.

<Si: 1.0% or less and Mn: 2.0% or less>

Si and Mn are added as deoxidizing elements, however, excessive addition thereof may decrease high-temperature strength. Thus, the content of Si is limited to 1.0% or less, and the content of Mn is limited to 2.0% or less. The content of Si is more preferably 0.5% or less, and the content of Mn is more preferably 1.5% or less. The lower limit of the content of Si is preferably 0.2% or more, and the lower limit of the content of Mn may be 0%.

<P: 0.04% or less (includes 0%) and S: 0.01% or less (includes 0%)>

P and S are impurity elements, and it is preferable that the contents thereof are small. The contents of P and S may be 0%, respectively. P and S are not actively added; however, P and S may be mixed in from a raw material, and the like, in a case where P and S are mixed in, P and S do not have a harmful effect on the characteristics of the metal gasket of the present invention, as long as the content of P is 0.04% or less, and the content of S is 0.01% or less. Therefore, the content of P is set to be 0.04% or less, and the content of S is set to be 0.01% or less. The content of P is preferably 0.03% or less and more preferably 0.01% or less. The content of S is preferably 0.005% or less and more preferably 0.003% or less.

<Ni: 25.0% to 60.0%>

Ni is an essential element for stabilizing an austenite phase matrix, in addition, since Ni is a constituent element of a γ' (gamma prime) phase, which is an age-precipitate phase that precipitates during use, Ni is an important element that increases room temperature kind high-temperature strength. In a case where the content of Ni is lower than 25.0%, precipitation of the γ' phase is insufficient, and the room temperature and high-temperature strength are decreased, in addition to the austenite phase being unstable. Thus, the lower limit of the content of Ni is set to be 25.0%. On the other hand, in a case where the content of Ni exceeds 60.0%, it becomes difficult to obtain the effect of further improving the characteristics of the metal gasket of the present invention, and the price will become drastically high, and thus, the upper limit of the content of Ni is set to be 60.0%.

In consideration of the price and the characteristics, the range of the content of Ni can be suitably limited within a range of 25.0% to 60.0%. Specifically, the range of the content of Ni is, for example, preferably 25.0% to 30.0%, in a case where strength at a high temperature is desired to be obtained from balance between the price and the characteristics. In addition, the range may be 30.0% to 49.0%, as the range within which strength can be improved. Furthermore, the range is preferably 50.0% to 60.0%, in a case where strength at a higher temperature is desired to be obtained.

<Cr: 10.0% to 20.0%>

Cr is an important element for maintaining oxidation resistance of, the metal gasket. In a case where the content of Cr is lower than 10.0%, oxidation resistance, which is necessary for the metal gasket, is not obtained. On the other hand, in a case where Cr is added at a content that exceeds 20.0%, the austenite phase of the base becomes unstable, and a harmful embrittlement phase such as an α' phase and a σ (sigma) phase is generated during long-term use, decreasing strength and ductility of the metal gasket, Therefore, the content of Cr is set to be 10.0% to 20.0%. The content of Cr is preferably 18.0% or less and more preferably 17.0% or less.

<One or both of Mo and W satisfy Mo+W/2: 0.05% to 5.0%>

Mo and W are elements of the same group and are elements that are effective in increasing room temperature and high-temperature strength of the metal gasket of the present invention by solid-solution strengthening the austenite phase together. In particular, Mo and W are necessary and important elements in the metal gasket of the present invention, since Mo and W have the effect of suppressing deformation at a high temperature by the interaction with dislocation during use. Mo and W may be added singly or may be added by being combined with each other. In a case of being added by being combined with each other, the addition amount can be expressed as Mo+W/2 by calculating the ratio between the atomic weights of Mo and W (this expression can be also applied to a case where Mo and W are added singly, if the content of any one of Mo and W is 0%).

In a case where Mo+W/2 is smaller than 0.05%, the effect of Mo and W on improving high-temperature strength is decreased, and, on the other hand, in a case where Mo and W are added at a content that exceeds 5.0%, an embrittlement phase such as Laves phase may be generated. Therefore, Mo+W/2 satisfied by one or both of Mo and W is set to be 0.05% to 50%. In consideration of the balance between the price and the characteristics, it is preferable that preferable upper limit of M and W is suitably contained in a range of 0.05% to 5.0%. Specifically, the content of Mo and W is, for example, preferably set to be 1.0% or less in terms of Mo+W/2, in a case where strength at a high temperature is desired to be obtained. In addition, in a case where high high-temperature strength is desired to be obtained, the content of Mo and W is 3.0% or less in terms of Mo+W/2. Furthermore, in a case where higher high-temperature strength is desired to be obtained, the content of Mo and W is preferably 3.5% or more in terms of Mo+W/2.

<Al: More than 0.8% and 3.0% or less>

Together with Ti and Nb, Al is one of the main, constituent elements oldie γ' phase, which is an intermetallic compound that age-precipitates during use. Also, Al is an element necessary for increasing room temperature and high-temperature strength during use. Al needs to be added at a content that exceeds 0.8% in order to contribute to strengthening by the precipitation of the γ' phase. On the other hand, in a case where Al is added at a content that exceeds 3.0%, hot workability is degraded. Thus, the content of Al is set to he more than 0.8% and 3.0% or less. A preferable range of the content of Al can be suitably selected within the above range, by balancing the content with the amounts of Ti and Nb, which are the main elements that constitute other γ' phases.

<Ti: 1.5% to 4.0%>

Together with Al and Nb, Ti is one of the main constituent elements of the γ' phase, which is an intermetallic compound that a age-precipitates during use. Also, Ti is an element necessary for increasing room temperature and high-temperature strength during use. Ti needs to be added at a content of 1.5% or more in order to contribute to strengthening by the precipitation of the γ' phase, however, in a case where Ti is added at a content that exceeds 4.0%, an η (eta) phase, which is a coarse intermetallic compound is easily generated during heating at a high temperature, and strength and ductility at a high temperature are decreased. Therefore, the content of Ti is set to be 1.5% to 4.0%. A preferable range of the content of Ta can be suitably selected within the above range, by balancing the content with the amounts of Al and Nb, which are the main elements that constitute other γ' phases.

<Nb: 0.05% to 2.5%>

Together with Al and Ti, Nb is one of the constituent elements of the γ' phase, which is an intermetallic compound that age-precipitates during use. Also, Nb is an element effective in increasing room temperature and high-temperature strength during use. In a case where the content of Nb is lower than 0.05%, the effect of increasing strength is insufficient. On the other hand, in a case where the content exceeds 2.3%, a coarse Laves phase formed of $Fe_2Nb$ is generated, decreasing strength and ductility at a high temperature. Therefore, the content of Nb is set to be 0.05% to 2.5%. A preferable range of the content of Nb can also be suitably selected within the above range, by balancing the content with the amounts of Al and Ti.

Ta, which belongs to the same group as Nb, is a high-priced element and is not required to be added in the metal gasket of the present invention. However, since Ta has the same effect as Nb in terms of strength, in a case where addition of Ta is considered, Ta can be substituted for Nb such that a relationship of Nb=Ta/2 is satisfied.

Preferable combinations of Al, Ti, and Nb can be suitably selected, and one of the combinations is Al: more than 0.8% arid 2.0% or less, Ti: 2.5% to 3.0%, and Nb: 0.05% to 1.0%, a second combination is Al: 1.6% to 3.0%, Ti: 1.5% to 3.0%, and Nb: 0.3%, to and a third combination is Al: 1.6% to 2.5&, Ti 1.5% to 3.0%, and Nb: 0.5% to 2.0%.

<V: 1.0% or less (includes 0%)>

V is added as necessary, since V refines austeinte crystal grains by, generating an MC-type carbide and has, an effect of improving strength and ductility at a room temperature and a high temperature. In a case where V is added, and in a case where the content of V exceeds 1.0%, a coarse carbide is formed, which may decrease ductility, or an oxide film that is unstable at a high temperature is formed, which may impair oxidation resistance. Therefore, the content of V is set to be 1.0% or less (includes 0%). In a case where V is added, the range of the content thereof is preferably 0.10% to 1.0%. The upper limit of the content of V is preferably 0.5%.

<B: 0.001% to 0.015%>

B is an element effective in increasing strength and ductility at a high temperature by the effect of strengthening a grain boundary, in a case where B is added in a small amount. However, in a case where B is added at a content that is lower than 0.001%, the effect is not sufficient, since a segregation amount at the grain boundary is small. On the other hand, in a case where B is added at a content that exceeds 0.015%, initial melting temperature during heathy is lowered, degrading hot workability. Therefore, the content of B is set to be 0.001% to 0.015%. The range of the content of B is preferably 0.001% to 0.010%.

<Mg: 0.0005% to 0.0>

Mg is added as a deoxidizing agent having an effect of reducing oxygen, as well as to improve hot workability by bonding with S that is segregated at the grain boundary to fix S. In a case where the content of Mg is lower than 0.0005%, the effects are, not sufficient. On the other band, in a case where Mg is added at a content that exceeds 0.01%, the amount of an oxide or a sulfide increases, decreasing, cleanliness of an inclusion, or the amount of a compound formed with Ni having a low melting point increases, degrading hot workability. Therefore, the content of Ni having is limited within 0.0005% to 0.01%. The lower limit of the content of Mg is preferably 0.001% and the upper limit of the content of Mg is preferably 0.007%. The upper limit of the content of Mg is more preferably 0.005%. Some of Mg may be substituted with Ca; in this ease, (Mg+0.6× Ca) may be limited within the range of Mg alone.

<S/Mg: 1.0 or less>

The addition amount of Mg is determined according to the amount of S, since the purpose of adding Mg is to improve hot workability by fixing S that segregates at the grain boundary. In order to suppress the harmful effect of S on hot workability, it is effective to limit the value of S/Mg to 1.0 or less. In a case where some or all of Mg is substituted with Ca, it is preferable to limit S/(Mg+0.6×Ca) to 1.0 or less. The relationships S/Mg and S/(Mg+0.6×Ca) are preferably 0.5 or less. <N: 0.01% or less (includes 0%) and O: 0.005% or less (includes 0%)>

O and N may bond with Al, Ti, Nb, or the like to form an oxide-based or a nitride-based inclusion, decreasing cleanliness and deteriorating fatigue strength and may reduce the amounts of Al, Ti, and Nb that forms the γ' phase, inhibiting: increase in strength b precipitate-strengthening during use. Therefore, it is preferable that the contents of O and N are suppressed to be as to as possible, and the content thereof may be 0%. The content of O is preferably 0.005% or less, and the content of N preferably 0.01% or less. The content of O is more preferably 0.004% or less, and the content of N is more preferably 0.005% or less.

<Remainder consisting of Fe and unavoidable impurities>

In order to obtain an alloy for the metal gasket of the, present invention, Fe is required as an inexpensive main element of the austenite phase constituting the matrix, and the remainder is substantially Fe. In the remainder, in addition to unavoidable impurities, the elements shown below can be allowed within the following range, since influence of the elements is substantially small as long as the elements are included within the range shown below.

Zr: ≤0.4% and REM: ≤0.1%

Ag, Sn, Pb, As, and Bi are also impurity elements that decrease high-temperature strength by segregating at the austenite grain boundary. The total content of Ag, Sn, Pb, As, and Bi is preferably limited to 0.01% or less.

<Metal structure>

Next, the reason for limiting the structure of the metal gasket will be described.

First, a precipitate-strengthening phase of an alloy having the composition specified in the present in is a γ' phase, and basically, a γ" (gamma double prime) phase is not precipitated. Since the γ' phase is a phase that is more stable even at a high temperature compared to the γ" phase, in a case where strength is required at a high temperature such as a temperature that exceeds 700° C., a composition of which the precipitate-strengthening phase is the γ' phase is selected. In a case where the γ" phase is the main precipitate-strengthening phase, strength greatly decreases at a high temperature that exceeds 700° C., and thus, in the present invention, the size of the γ' phase is specified as the precipitate-strengthening phase. An "equivalent circle diameter" of the precipitate γ' phase specified in the present invention refers to an average equivalent circle diameter, The expression "a precipitate γ' phase of 25 nm or greater is not present" means that either the γ' phase is not present, or, even in a case where the γ' phase is present, the size of the γ' phase is smaller, than 25 nm, in terms of an average equivalent circle diameter. In a case of being specified in, another way, the expression means that "the average equivalent circle diameter of the γ' phase in an austenite base is smaller than 25 nm (includes 0)".

To perform cold working into the metal gasket shape, the state of the alloy of the present invention before the process of shaping is required to have softness that allows sufficient cold plastic working. To obtain a soft metal structure, the alloy is required to be in a state in which a solution treatment is performed thereon or in a state in which cold working such as cold rolling is performed thereon at a low degree of working that allows cold forming into the metal gasket shape, it is preferable that the alloy is in a state in which aging treatment which causes active precipitation hardening is not performed thereon.

The metal structure in such state is a structure of which the base is formed of an austenite structure, and in the austenite matrix, the γ' phase which is an aging precipitation strengthening phase is not precipitated, or even in a case where the phase is precipitated, the phase is in a state in which the skit thereof is small such that the effect of precipitate strengthening is not sufficient. In a case Where the metal gasket is used in this state, the γ' phase in the austenite base naturally age-precipitates by being exposed to a high temperature during use, and the strength of the metal gasket can be increased by precipitate strengthening.

In a case where the average equivalent circle diameter of the γ' phase that precipitates in the austenite matrix, before use, is 25 nm or greater, the effect of precipitate strengthening becomes greater, and it becomes difficult to perform the process of cold forming into the metal gasket shape. Therefore, in a case where the γ' phase in the austenite matrix precipitates, the average equivalent circle diameter of the γ' phase is set to be smaller than 25 nm. The average equivalent circle diameter is preferably smaller than 20 nm and more preferably 15 nm or less. The same applies to a state in which the γ' phase does not precipitate, such as the state in which the solution treatment is performed. Furthermore, the austenite matrix may be in a state without deformation or may be in a state of being deformed by the cold working, and it is preferable that the deformation by the cold working is small.

As long as the γ' phase having an average equivalent circle diameter of smaller than 25 nm, preferably smaller than 20 nm precipitates in the austenite matrix of the structure before use, strength can be suitably increased before use, and deformation during the initial phase can be suppressed by performing a simple aging treatment for a short period of time before use, after the forming into the metal gasket shape.

The size of a precipitate γ' phase particle can be measured by observing the particle using a transmission electron microscope (TEM). The precipitate γ' phase is known to substantially homogeneously precipitate in the austenite matrix, and during the initial phase of the age-precipitation, the phase precipitates in a substantially spherical shape. Therefore, it is possible enough to observe an average form of the structure even in a limited field of view that can be observed under a high-magnification TEM. For example, an average diameter obtained using any one of a method in which one field of view of an image of a dark field of view that corresponds to an electron beam diffraction spot of the γ' phase in an approximately 150 nm² field of view is selected, and the average equivalent circle diameter of the precipitate γ' phase particles is obtained from the observed image, and a method in which one field of view of an approximately 150 to 200 nm² field of view is selected, and the average equivalent circle diameter of the precipitate γ' phase particles is obtained by mapping using an energy dispersive X-ray (EDX) analysis of Fe, Ni, Al, Ti, and the like can be obtained as the average equivalent circle diameter of the γ' phase. When obtaining the diameter of a γ' phase particle, there is a possibility that a γ' phase particle present at a backside of a sample (depth direction side) other than the particles visible on the surface is also transmitted or detected, and thus, particles that appear to be elliptical by being superimposed may be excluded from the object far measurement, any 30 or more γ' phase particles may be selected and measured, and the average thereof may be obtained.

<Production method>

Next, a method for producing a metal gasket will be described.

The metal gasket of the present invention is subjected to plastic working to have a required thickness, which is 1 mm or less, by performing cold rolling on a material tor cold rolling (for example, a hot rolled plate or a hot rolled coil). Thereafter, the material is cut into a shape of a metal gasket and subjected to cold forming. In the course of the cold plastic working, a solution treatment is performed in order to dissolve the γ' phase which is a precipitate-strengthening phase that can precipitate during the hot working.

The solution treatment may be performed during the cold rolling process or may be performed after the cold rolling, Since the solution treatment is desirably performed at a temperature that is equal to or higher than the solid soluble temperature of the γ' phase, the temperature for the solution treatment is set to be 900° C. or higher. Since crystal grains are coarsened and ductility is decreased in a case where the solution treatment is performed at a temperate that is higher than 1150° C., the temperature for the solution treatment is set to be 900° C. to 1150° C. There is a case where the γ' phase slightly precipitates during cooling after the solution treatment, however, even in this case, it is necessarily to select a condition of rapid cooling that causes the size of the γ' phase to be smaller than 25 nm, preferably smaller than 20 nm, in terms of the average equivalent circle diameter.

In the present invention, as long as the γ' phase having an average equivalent circle diameter of smaller than 25 nm (preferably smaller than 20 nm) precipitates in the austenite matrix of the structure before use, strength can be suitably increased before use, and deformation during the initial phase can be suppressed by performing a simple aging treatment at 700° C. to 850° C. for a short period of time of 0.5 to 5 hours before use, after the forming into the metal gasket shape. In a ease where the temperature for the aging treatment is lower than 700° C., hardness cannot be suitably increased by performing the treatment for a short period of time. On the other hand, at a temperature that is 850° C. or higher, the γ' phase coarsens in the short period of time and the hardening effect cannot be expected during use. In a case where aging treatment time is shorter than 0.5 hours, hardening cannot be observed. On the other hand, in a case where the aging treatment time is longer than 5 hours, the (γ) phase coarsens, and the treatment is costly, Thus, the condition for performing the aging treatment for a short period of time is set to be at 700° C. to 850° C. for 0.5 to 5 hours. The lower limit of the aging, treatment temperature is preferably 735° C., and the upper limit of the aging treatment temperature is preferably 780° C. In addition, the lower limit of the aging treatment time is preferably one hour.

Examples

Table 1 shows the alloy compositions of metal gaskets of the embodiments of the present invention (Examples 1 to 4 of the present invention) and the embodiment of Comparative Example (Comparative Example 10). Cold rolling was performed using materials for hot roiling having the alloy compositions, and the materials were subjected to plastic working into thin plates having a thickness of 0.2 mm. Thereafter, a solution treatment was performed at the temperature held at 1050° C. for 0.5 hours, and then the materials were air cooled (The materials are referred to as solution-treated materials). Furthermore, after performing the solution treatment, an aging, treatment: was performed on thin plates of Examples of the present invention at 750° C. for a short period of time of 4 hours. A thin plate of Comparative Example was subjected to an aging, treatment for a long period of time of: maintaining at the temperature of 720° C. for 8 hours; thereafter cooling to 620° C. over two hours; maintaining at the temperature of 620° C. for 8 hours; and thereafter air cooling. The materials are referred to as age-treated materials. Microstructure observation, Vickers hardness measurement, and a heat deformation test were performed on the solution-treated materials and the age-treated materials. In the heat deformation test, heating was performed at 800° C. for 4 hours in a state of bending the center portion of a plate-shaped test specimen of width 10 mm×length 100 mm in the length direction by 5 mm with respect to the length of 80 mm, and evaluation was performed by measuring the amount of bending deformation after cooling (here, the amount is referred to as a heat deformation amount).

TABLE 1

| Alloy | C | Si | Mn | P | S | Ni | Cr | Mo | Al | Ti | Nb | B | Mg | (mass %) Note |
|---|---|---|---|---|---|---|---|---|---|---|---|---|---|---|
| 1 | 0.04 | 0.15 | 0.31 | 0.002 | 0.001 | 27.4 | 13.1 | 0.53 | 1.13 | 2.80 | 0.40 | 0.004 | 0.002 | Example of present invention |
| 2 | 0.03 | 0.14 | 0.06 | 0.006 | 0.002 | 31.2 | 14.3 | 0.74 | 1.90 | 2.70 | 0.60 | 0.005 | 0.002 | Example of present invention |
| 3 | 0.03 | 0.16 | 0.14 | 0.012 | 0.002 | 41.8 | 14.9 | 0.70 | 1.90 | 2.30 | 1.20 | 0.004 | 0.002 | Example of present invention |
| 4 | 0.03 | 0.10 | 0.10 | 0.008 | 0.001 | 55.0 | 16.3 | 3.70 | 1.80 | 2.10 | 1.10 | 0.004 | 0.004 | Example of present invention |
| 10 | 0.02 | 0.10 | 0.06 | 0.007 | 0.001 | 52.6 | 18.4 | 3.00 | 0.58 | 0.95 | 5.16 | 0.005 | 0.001 | Comparative Example |

Note 1.
All satisfy N ≤ 0.005% and O ≤ 0.003%
Note 2.
Remainder consists of Fe and unavoidable impurities In a state in which the solution treatment had been performed on alloys of Examples of the present invention, microstructure observation was performed using an optical microscope. As a result, all of the base structures were single phases of an austenite phase. In addition, as a result of performing the microstructure observation using TEM, the γ' phase was not observed in all of the austenite crystal grains. Furthermore, as a result of performing the microstructure observation of the alloys of Examples of the present invention using TEM after performing the aging treatment for a short period of time, γ' phase particles that precipitated in the austenite crystal grains were observed. The result of measuring average equivalent circle diameters of the γ' phase is shown in Table 2. As shown in Table 2, the average equivalent circle diameters were smaller than 20 nm. Meanwhile, in an alloy of Comparative Example 10 that had been subjected to the aging treatment a large amount of a plate-shaped γ" phase which is unstable at a high temperature exceeding 700° C. precipitated, in addition to a small amount of γ' phase particles.

TABLE 2

| Alloy | Aging treatment | Average equivalent circle diameter of γ' phase particles (nm) |
|---|---|---|
| 1 | 750° C. × 4 hours | 10.0 |
| 2 | 750° C. × 4 hours | 11.4 |

TABLE 2-continued

| Alloy | Aging treatment | Average equivalent circle diameter of γ' phase particles (nm) |
|---|---|---|
| 3 | 750° C. × 4 hours | 12.0 |
| 4 | 750° C. × 4 hours | 14.2 |

FIG. 1 shows Vickers hardness at room temperature after the solution treatment and after the aging treatment. All of hardness after the solution treatment was approximately ISO to 300 HV in terms of Vickers hardness, and the hardness was sufficient to allow a forming process into a metal gasket Shape without any problem. The hardness after the aging treatment in Examples 1 to 4 of the present invention was approximately 350 to 400 HV, which is slightly greater than the hardness after the solution treatment, however, the hardness is still lower than the hardness in Comparative Example 10.

Figure 2:
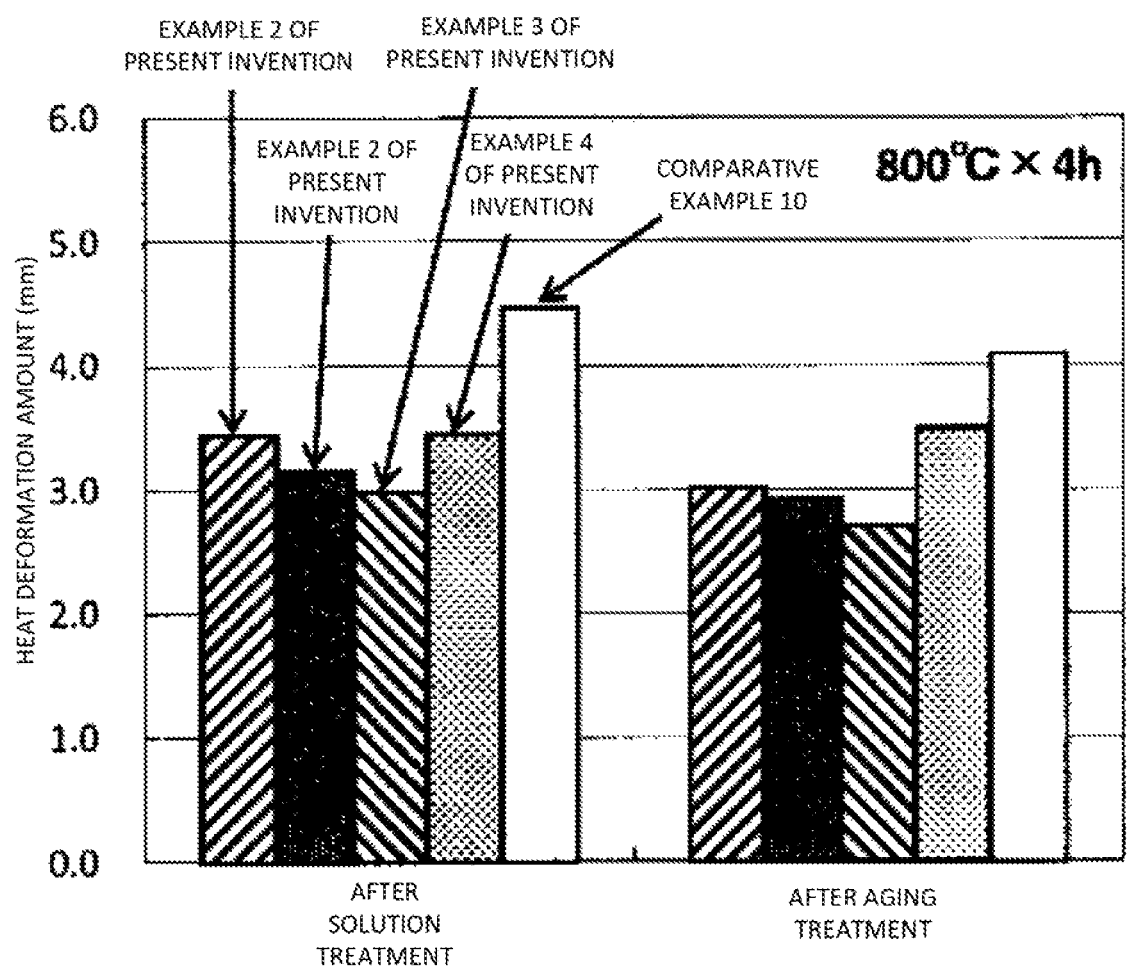
FIG. 2 is a graph for comparing beat deformation amounts after the solution treatment and after the aging treatment.

FIG. 2 shows heat deformation amounts after the solution treatment and after the aging treatment. As shown in FIG. 2, the alloys of Examples 1 to 4 of the present invention have smaller heat deformation amounts and more favorable heat deformation resistance both after the solution treatment and after the aging treatment, compared to the alloy of Comparative Example 10, The heat deformation amounts of the alloys of Examples 1 to 4 of the present invention after the solution treatment are smaller than the heat deformation amount of the alloy of Comparative Example 10 after the aging treatment, and the alloys of Examples 1 to 4 of the present invention after the solution treatment exhibit favorable heat deformation resistance. The aging treatments that are performed on the alloys shown in Examples 1 to 4 of the present invention are all aging treatments performed at 750° C. far a short period et tune of 4 hours. However, the alloys of Examples 1 to 4 of the present invention still have smaller heat deformation amounts than that of the alloy of Comparative Example 10 subjected to the aging treatment for a long period of time, and the difference between the heat deformation amount after the aging treatment and the beat deformation amount after the solution treatment was equal to or smaller than that of the alloy of Comparative Example 10. Therefore, it is understood that even in a case Where an aging treatment is performed for a short period of time, an alloy exhibits favorable heat deformation resistance. This is attributable to the precipitation of the relatively fine γ' phase, which is stable at, a high temperature, in the alloys of Examples 1 to 4 of the present invention. Precipitate strengthening by the γ' phase of acts on the alloys in a case of maintaining the alloys at a high temperature, thus allowing the alloys to exhibit small heat deformation amounts. On the other hand, in the alloy of Comparative Example 10, the γ" phase which is unstable at a high temperature mainly precipitates. Thus, strength decreases in a case of maintaining the alloy at a high temperature, and the alloy exhibits a lame heat deformation amount.

In this manner, although the hardness of the alloys of Examples 1 to 4 of the present invention alter the solution treatment and after the aging treatment is lower than that of the alloy of Comparative Example 10 after the aging treatment it is understood that the alloys of Examples 1 to 4 of the present invention exhibit favorable heat deformation resistance, and in Examples 1 to 4 of the present invention, sufficiently favorable heat deformation resistance can be obtained by only performing the solution treatment and performing the aging treatment for a short period of time, compared to Comparative Example 10.

Industrial Applicability

As described above, in a case where the metal gasket of the present invention and the method for producing the metal gasket are applied to a joint pan exposed to ;a high temperature such, as an exhaust system of an automobile engine, the joint part can have both cold formability into a gasket shape and high strength at a high temperature during use, and heat deformation can be suppressed during use. Therefore, the joint part exhibit higher reliability.

What is claimed is:

1. A metal gasket consisting of, in terms of % by mass, C: 0.10% or less, Si: 1.0% or less, Mn: 2.0% or less, P: 0.04% or less, S: 0.01% or less, Ni: 25.0% to 60.0%, Cr: 10.0% to 20.0%, one or both of Mo and W satisfying Mo+W/2: 0.05% to 5.0%, Al: 1.6% to 3.0%, Ti: 1.5% to 3.0%, Nb: 0.3% to 2.5%, V: 1.0% or less, B: 0.001% to 0.015%, Mg: 0.0005% to 0.01%, wherein S/Mg: 1.0 or less, N: 0.01% or less, O: 0.005% or less, and a remainder consisting of Fe and unavoidable impurities,
    wherein the metal gasket has a metal structure having an austenite matrix,
    wherein either:
        a precipitate γ' phase is not present in the austenite matrix; or,
        if a precipitate γ' phase is present in the austenite matrix, the precipitate γ' phase present in the austenite matrix has an average equivalent circle diameter smaller than 25 nm,
    wherein the precipitate γ' phase consists of constituent elements selected from the group consisting of Ni, Al, Ti, and Nb, and
    wherein the metal gasket has a thickness of 1 mm or less.

2. The metal gasket according to claim 1, wherein an average equivalent circle diameter of the precipitate γ' phase is smaller than 20 nm.

3. A method for producing the metal gasket of claim 1 consisting of, in terms of % by mass, C: 0.10% or less, Si: 1.0% or less, Mn: 2.0% or less, P: 0.04% or less, S: 0.01% or less, Ni: 25.0% to 60.0%, Cr: 10.0% to 20.0%, one or both of Mo and W satisfying Mo+W/2: 0.05% to 5.0%, Al: 1.6% to 3.0%, Ti: 1.5% to 3.0%, Nb: 0.3% to 2.5%, V: 1.0% or less, B: 0.001% to 0.015%, Mg: 0.0005% to 0.01%, wherein S/Mg: 1.0 or less, N: 0.01% or less, O: 0.005% or less, and a remainder consisting of Fe and unavoidable impurities,
    wherein the method comprises:
        plastic working of a material for cold rolling having the composition into a thin plate shape by performing cold rolling on the material; and performing a process of forming the material into a metal gasket shape having a thickness of 1 mm or less.

4. The method for producing a metal gasket according to claim 3, wherein the precipitate γ' phase has an average equivalent circle diameter of smaller than 20 nm.

5. The method for producing a metal gasket according to claim 3, further comprising performing a solution treatment on the metal gasket subjected to the process of forming into the metal gasket shape at 900° C. to 1150° C.

6. The method for producing a metal gasket according to claim 3, further comprising performing an aging treatment on the metal gasket subjected to the process of forming into the metal gasket shape at 700° C. to 850° C. for 0.5 to 5 hours.

7. The method for producing a metal gasket according to claim 4, further comprising performing a solution treatment on the metal gasket subjected to the process of forming into the metal gasket shape at 900° C. to 1150° C.

8. The method for producing a metal gasket according to claim 4, further comprising performing an aging treatment on the metal gasket subjected to the process of forming into the metal gasket shape at 700° C. to 850° C. for 0.5 to 5 hours.

* * * * *